(12) United States Patent
Yamaguchi et al.

(10) Patent No.: US 6,882,508 B2
(45) Date of Patent: Apr. 19, 2005

(54) THIN-FILM MAGNETIC HEAD HAVING A MAGNETISM INTERCEPTING LAYER PROVIDED BETWEEN READ HEAD AND WRITE HEAD

(75) Inventors: Atsushi Yamaguchi, Tokyo (JP); Shigeru Shoji, Tokyo (JP)

(73) Assignee: TDK Corporation, Tokyo (JP)

( * ) Notice: Subject to any disclaimer, the term of this patent is extended or adjusted under 35 U.S.C. 154(b) by 178 days.

(21) Appl. No.: 09/853,158

(22) Filed: May 10, 2001

(65) Prior Publication Data

US 2001/0048578 A1 Dec. 6, 2001

(30) Foreign Application Priority Data

May 23, 2000 (JP) ...................................... 2000-150894

(51) Int. Cl.[7] .............................. G11B 5/39; G11B 5/31
(52) U.S. Cl. ...................................... 360/317; 360/126
(58) Field of Search ................................ 360/317, 126

(56) References Cited

U.S. PATENT DOCUMENTS

| 5,739,991 | A | * | 4/1998 | Matono et al. | |
|---|---|---|---|---|---|
| 5,850,325 | A | * | 12/1998 | Miyauchi et al. | 360/317 |
| 6,292,334 | B1 | * | 9/2001 | Koike et al. | 360/319 |
| 6,404,601 | B1 | * | 6/2002 | Rottmayer et al. | 360/317 |
| 6,430,009 | B1 | * | 8/2002 | Komaki et al. | 360/317 |
| 6,445,537 | B1 | * | 9/2002 | Cates | 360/126 |
| 6,504,686 | B1 | * | 1/2003 | Sasaki | 360/317 |

OTHER PUBLICATIONS

"Allicat Magnetoresistive Head Design And Performance", Hannon et al., IEEE Transactions on Magnetics, vol. 30, No. 2, Mar. 1994, pp. 298–302.

* cited by examiner

Primary Examiner—Craig A. Renner
(74) Attorney, Agent, or Firm—Oliff & Berridge, PLC

(57) ABSTRACT

A thin-film magnetic head comprises a read head and a write head. The read head and the write head are placed such that a top shield layer of the read head and a bottom pole layer of the write head are opposed to each other. A magnetism intercepting layer is provided between the top shield layer and the bottom pole layer. The magnetism intercepting layer is made of a nonmagnetic metal material that is capable of being formed through plating, such as platinum. The top shield layer, the magnetism intercepting layer and the bottom pole layer are consecutively formed through plating.

4 Claims, 14 Drawing Sheets

THIN-FILM MAGNETIC HEAD HAVING A MAGNETISM INTERCEPTING LAYER PROVIDED BETWEEN READ HEAD AND WRITE HEAD

BACKGROUND OF THE INVENTION

1. Field of the Invention

The present invention relates to a composite thin-film magnetic head comprising a read head and a write head and a method of manufacturing such a thin-film magnetic head.

2. Description of the Related Art

Performance improvements in thin-film magnetic heads have been sought as areal recording density of hard disk drives has increased. Consequently, in place of thin-film magnetic heads incorporating an induction-type electromagnetic transducer that performs reading and writing, composite thin-film magnetic heads have been widely used. A composite head is made up of a combination of a write (recording) head having an induction-type electromagnetic transducer for writing and a read (reproducing) head having a magnetoresistive (MR) element for reading.

Reference is now made to FIG. 11 and FIG. 12 to describe examples of configuration of related-art composite thin-film magnetic heads. FIG. 11 is a cross section of one of the examples of the configuration of the thin-film magnetic heads wherein a single layer functions as both one of shield layers of a read head and a magnetic pole layer of a write head that forms one of magnetic poles. FIG. 12 is a cross section of the other of the examples of configuration of the thin-film magnetic heads wherein a write head and a read head are separated.

The thin-film magnetic head of FIG. 11 comprises: a substrate 101 made of a ceramic material such as aluminum oxide and titanium carbide ($Al_2O_3$—TiC); an insulating layer 102 made of an insulting material such as alumina ($Al_2O_3$) and formed on the substrate 101; a read (reproducing) head formed on the insulating layer 102; a write (recording) head formed on the read head; and an overcoat layer 118 covering the write head.

The read head comprises: a bottom shield layer 103 made of a magnetic material and formed on the insulating layer 102; a bottom shield gap film 104 made of an insulating material such as alumina and formed on the bottom shield layer 103; and an MR element 105 for reading formed on the bottom shield gap film 104 and having an end located in the air bearing surface (the medium facing surface that faces toward a recording medium). The read head further comprises: a pair of lead layers 106 formed on the bottom shield gap film 104 and electrically connected to the MR element 105; a top shield gap film 107 covering the bottom shield gap film 104, the MR element 105 and the lead layers 106; and a top-shield-layer-cum-bottom-pole-layer (hereinafter called a bottom pole layer) 110 made of a magnetic material and formed on the top shield gap film 107.

The write head comprises: the bottom pole layer 110; a write gap layer 111 made of an insulating material such as alumina and formed on the bottom pole layer 110; and a top pole layer 117 made of a magnetic material and formed on the write gap layer 111. The overcoat layer 118 is made of an insulating material such as alumina and covers the top pole layer 117.

Each of the bottom pole layer 110 and the top pole layer 117 has a magnetic pole portion that is a portion located on a side of the air bearing surface. These pole portions are opposed to each other, the gap layer 111 being located between the pole portions. Although not shown, the top pole layer 117 has an end located farther from the air bearing surface. This end of the top pole layer 117 is connected and magnetically coupled to the bottom pole layer 110 through a contact hole formed in the write gap layer 111. Although not shown, a thin-film coil is provided between the bottom pole layer 110 and the top pole layer 117, the coil being insulated therefrom.

The thin-film magnetic head of FIG. 12 comprises: the substrate 101 made of a ceramic material such as aluminum oxide and titanium carbide; the insulating layer 102 made of an insulting material such as alumina and formed on the substrate 101; the read head formed on the insulating layer 102; the write head formed on the read head; the overcoat layer 118 covering the write head; and a magnetism intercepting layer 109, provided between the read head and the write head, for intercepting magnetism.

As the thin-film magnetic head of FIG. 11, the read head comprises: the bottom shield layer 103, the bottom shield gap film 104, the MR element 105, the lead layers 106, and the top shield gap film 107. In addition, the read head comprises a top shield layer 108 made of a magnetic material and formed on the top shield gap film 107.

The write head comprises: the bottom pole layer 110; the write gap layer 111 made of an insulating material such as alumina and formed on the bottom pole layer 110; and the top pole layer 117 made of a magnetic material and formed on the write gap layer 111.

In the thin-film magnetic head of FIG. 12, the magnetism intercepting layer 109 is provided between the top shield layer 108 and the bottom pole layer 110.

The configuration of thin-film magnetic heads that was initially common is the one in which the write head and the read head are separated, as shown in FIG. 12. The configuration of thin-film magnetic heads that was proposed thereafter is the one in which the top shield layer of the read head and the bottom pole layer of the write head are merged, as shown in FIG. 11, in response to the demands for, for example, streamlining the manufacturing process and for minimizing the space between the write gap layer and the MR element. Many heads have been thus designed to have such a configuration. (See David Hannon et al., 'Allicat Magnetoresistive Head Design and Performance', IEEE Transaction on Magnetics, Vol. 30, No. 2, pp. 298 to 302, March 1994.)

However, if the read track width of the thin-film magnetic head is reduced and improvements in the performance of the read head, such as an increase in sensitivity of the MR element, are thereby promoted, pulse-shaped noise may be produced in a read signal when reading is performed immediately after writing, the noise having a peak value extremely higher than that of normal white noise. This noise is considered to result from relaxation of magnetization in the top shield layer caused by the magnetic field applied to the top shield layer while writing is performed by the write head. Alternatively, the noise is considered to result from relaxation of magnetization of the MR element that occurs when a strong magnetic field created by the top shield layer is directly applied to the MR element. Such noise resulting from unstable magnetization immediately after writing is called write induced noise in the present patent application. The frequency of occurrence of this noise increases as the sensitivity of the MR element increases. The occurrences of servo errors and so on thereby increase and become a great factor that reduces the response rate of the hard disk drive.

Since such problems have frequently arisen, the configuration of thin-film magnetic heads in which the write head and the read head are separated, as shown in FIG. 12, have been adopted again.

However, the space between the write gap layer and the MR element is greater in the head having the write head and the read head separated. In the head shown in FIG. 12, for example, the space between the write gap layer 111 and the MR element 105 is greater than 5.5 µm, if the top shield layer 108 is 2.5 µm thick, the magnetism intercepting layer 109 is 0.5 to 1 µm thick, and the bottom pole layer 110 is 2.5 µm thick. In the high-density composite thin-film magnetic head, it is disadvantageous that the space between the write gap layer and the MR element is increased when servo control is performed.

In addition, it is required to fabricate the top shield layer, the magnetism intercepting layer and the bottom pole layer separately for the related-art head in which the write head and the read head are separated by the magnetism intercepting layer. As a result, not only the period of time required for manufacturing increases but also an increase in the number of manufacturing steps leads to an increase in costs.

Reference is now made to FIG. 13 to FIG. 25 to describe this problem. FIG. 13 to FIG. 25 are cross sections for illustrating an example of method of forming the top shield layer, the magnetism intercepting layer and the bottom pole layer. In this method, as shown in FIG. 13, a bonding layer 152 made of titanium (Ti), for example, is formed, as required, on a layer 151 to be the base of the top shield layer. The bonding layer 152 is provided for increasing the adhesiveness of the layer 151 to an electrode film described later. Next, on the bonding layer 152, the electrode film 153 is formed for making the top shield layer through plating.

Next, as shown in FIG. 14, a resist is patterned into a specific shape to form a frame 154 used for making the top shield layer.

Next, as shown in FIG. 15, frame plating is performed, using the frame 154, to form plating layers 155A and 155B on the electrode film 153. Numeral 155A indicates the plating layer to be the top shield layer. Numeral 155B indicates the other plating layers. Next, as shown in FIG. 16, the frame 154 is removed.

Next, as shown in FIG. 17, a portion of the electrode film 153 located in the region where the frame 154 was located is removed through ion milling, for example.

Next, as shown in FIG. 18, a patterned resist 156 is formed to cover the plating layer 155A.

Next, as shown in FIG. 19, the plating layers 155B that are not covered with the patterned resist 156 are removed. Next, as shown in FIG. 20, the patterned resist 156 is removed.

Next, as shown in FIG. 21, the bonding layer 152 except a portion thereof located below the plating layer 155A is removed through ion milling, for example.

Next, as shown in FIG. 22, the magnetism intercepting layer 157 made of inorganic oxide is formed over the entire surface through sputtering, for example.

Next, although not shown, a portion of the magnetism intercepting layer 157 in which the electrode layer is to be formed is etched, so that conduction is made between the lead layers connected to the MR element and the electrode layer to be formed on the magnetism intercepting layer 157. For this etching, on the magnetism intercepting layer 157, a patterned resist is formed to cover the layer 157 except the portion thereof in which the electrode layer is to be formed. Next, using this patterned resist as a mask, the portion of the layer 157 in which the electrode layer is to be formed is etched through ion milling, for example. The patterned resist is then removed.

Next, as shown in FIG. 23, a bonding layer 158 made of titanium (Ti), for example, is formed, as required, on the magnetism intercepting layer 157. Next, on the bonding layer 158, the electrode film 159 is formed for making the bottom pole layer through plating.

Next, as shown in FIG. 24, a resist is patterned into a specific shape to form a frame 160 used for making the bottom pole layer.

Next, as shown in FIG. 25, plating is performed, using the frame 160, to form plating layers 161A and 161B. Numeral 161A indicates the plating layer to be the bottom pole layer. Numeral 161B indicates the other plating layers.

As thus described, a great number of steps are required to fabricate the top shield layer, the magnetism intercepting layer and the bottom pole layer of the related-art head in which the write head and the read head are separated by the magnetism intercepting layer.

OBJECT AND SUMMARY OF THE INVENTION

It is an object of the invention to provide a thin-film magnetic head and a method of manufacturing the same for reducing noise produced in a read signal immediately after writing, and for suppressing increases in costs and a period of time required for manufacturing.

A thin-film magnetic head of the invention comprises: a medium facing surface that faces toward a recording medium; a read head including: a magnetoresistive element; and a first shield layer and a second shield layer for shielding the magnetoresistive element, the first and second shield layers having portions that are located in regions on a side of the medium facing surface and opposed to each other, the magnetoresistive element being placed between the portions of the shield layers; and a write head including: a first magnetic layer and a second magnetic layer that are magnetically coupled to each other and include magnetic pole portions opposed to each other and placed in regions on a side of the medium facing surface, each of the magnetic layers including at least one layer; a gap layer provided between the pole portions of the first and second magnetic layers; and a thin-film coil at least part of which is placed between the first and second magnetic layers, the at least part of the coil being insulated from the first and second magnetic layers. The read head and the write head are placed such that one of the shield layers of the read head and one of the magnetic layers of the write head are opposed to each other. The thin-film magnetic head further comprises a magnetism intercepting layer for intercepting magnetism provided between the one of the shield layers and the one of the magnetic layers, and made of a nonmagnetic metal material that is capable of being formed through plating.

According to the thin-film magnetic head of the invention, the magnetism intercepting layer provided between the one of the shield layers of the read head and the one of the magnetic layers of the write head is made of a nonmagnetic metal material that is capable of being formed through plating. As a result, it is possible to form the magnetism intercepting layer and at least one of the one of the shield layers and the one of the magnetic layers through plating consecutively.

A method of the invention is provided for manufacturing a thin-film magnetic head comprising: a medium facing surface that faces toward a recording medium; a read head including: a magnetoresistive element; and a first shield layer and a second shield layer for shielding the magnetoresistive element, the first and second shield layers having portions that are located in regions on a side of the medium facing surface and opposed to each other, the magnetoresistive element being placed between the portions of the shield layers; and a write head including: a first magnetic layer and a second magnetic layer that are magnetically coupled to each other and include magnetic pole portions opposed to each other and placed in regions on a side of the medium facing surface, each of the magnetic layers including at least one layer; a gap layer provided between the pole portions of the first and second magnetic layers; and a thin-film coil at least part of which is placed between the first and second magnetic layers, the at least part of the coil being insulated from the first and second magnetic layers. The read head and the write head are placed such that one of the shield layers of the read head and one of the magnetic layers of the write head are opposed to each other. The thin-film magnetic head further comprises a magnetism intercepting layer for intercepting magnetism provided between the one of the shield layers and the one of the magnetic layers. The method includes the steps of: forming one of the read head and the write head; forming the magnetism intercepting layer through plating, the magnetism intercepting layer being made of a nonmagnetic metal material that is capable of being formed through plating; and forming the other one of the read head and the write head.

According to the method of manufacturing the thin-film magnetic head of the invention, the magnetism intercepting layer provided between the one of the shield layers of the read head and the one of the magnetic layers of the write head is formed through plating. As a result, it is possible to form the magnetism intercepting layer and at least one of the one of the shield layers and the one of the magnetic layers through plating consecutively.

According to the thin-film magnetic head or the method of manufacturing the same of the invention, the nonmagnetic metal material may have a Vickers hardness of 400 or greater.

According to the thin-film magnetic head or the method of manufacturing the same of the invention, the nonmagnetic metal material may be made of a single element that is not used for the one of the shield layers and the one of the magnetic layers.

According to the thin-film magnetic head or the method of manufacturing the same of the invention, the nonmagnetic metal material may be platinum.

According to the thin-film magnetic head or the method of manufacturing the same of the invention, the magnetism intercepting layer may have a thickness of 0.05 μm or greater.

According to the method of manufacturing the thin-film magnetic head of the invention, the one of the shield layers, the magnetism intercepting layer and the one of the magnetic layers may be consecutively formed through plating.

Other and further objects, features and advantages of the invention will appear more fully from the following description.

DETAILED DESCRIPTION OF THE PREFERRED EMBODIMENT

A preferred embodiment of the invention will now be described in detail with reference to the accompanying drawings.

Figure 1:
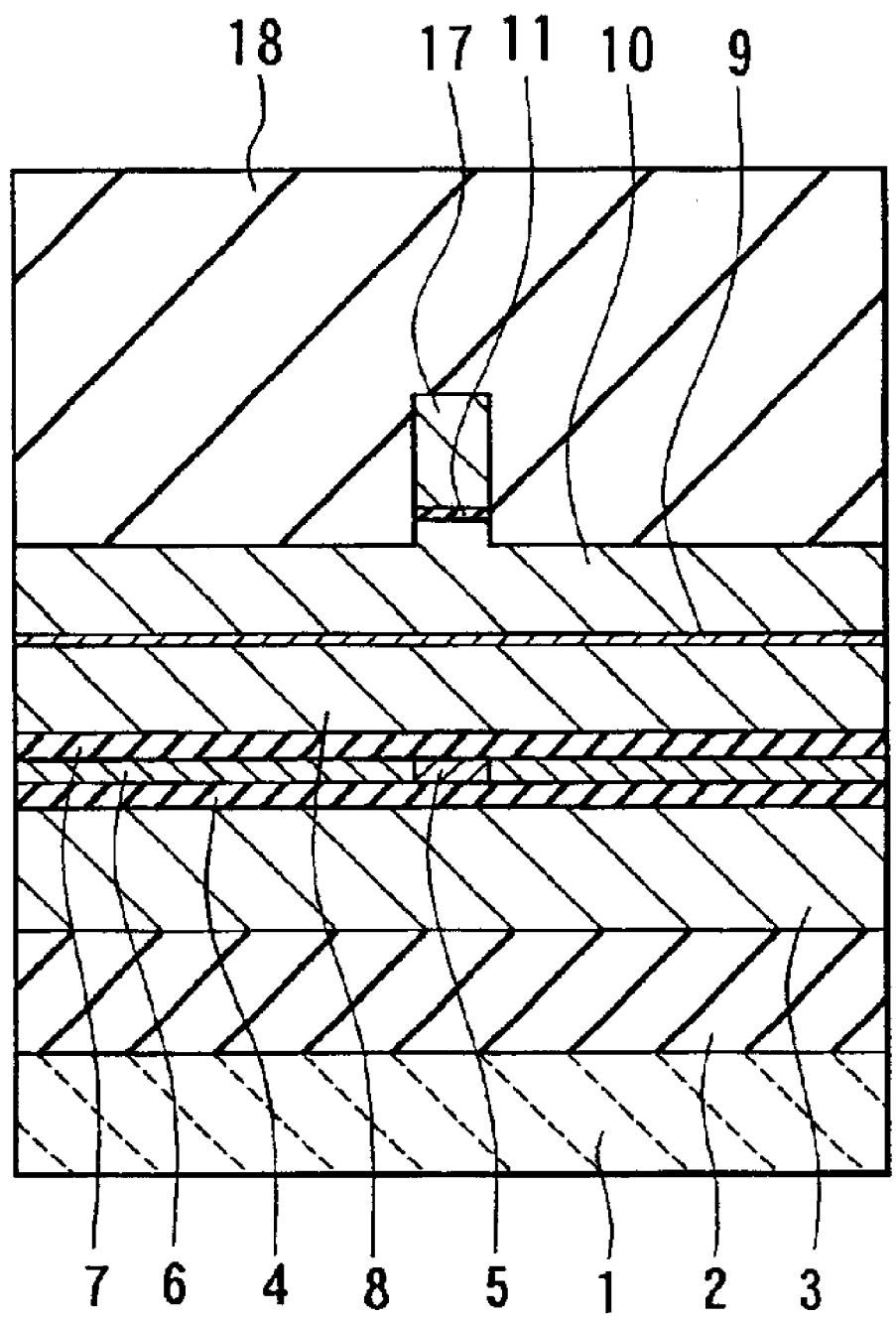
FIG. 1 is a cross section parallel to the air bearing surface of a pole portion of a thin-film magnetic head of an embodiment of the invention.
Figure 2:
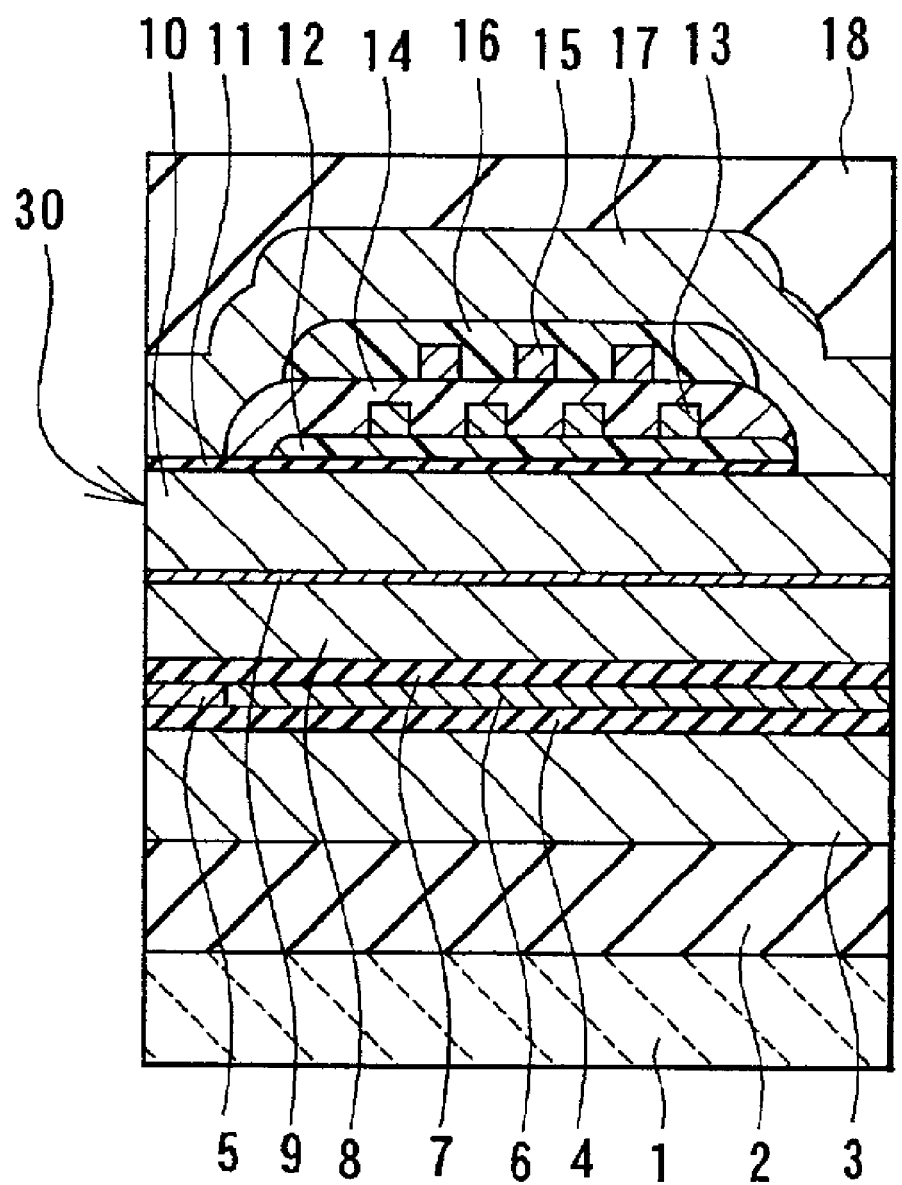
FIG. 2 is a cross section orthogonal to the air bearing surface of the thin-film magnetic head of the embodiment.

FIG. 1 is a cross section parallel to the air bearing surface (the medium facing surface that faces toward a recording medium) of the pole portion of a thin-film magnetic head of an embodiment of the invention. FIG. 2 is a cross section orthogonal to the air bearing surface of the thin-film magnetic head.

The thin-film magnetic head of this embodiment comprises: a substrate 1 made of a ceramic material such as aluminum oxide and titanium carbide ($Al_2O_3$—TiC); an insulating layer 2 made of an insulating material such as alumina ($Al_2O_3$) and formed on the substrate 1; a read (reproducing) head formed on the insulating layer 2; a write (recording) head formed on the read head; an overcoat layer 18 covering the write head; and a magnetism intercepting layer 9, provided between the read head and the write head, for intercepting magnetism.

The read head comprises: a bottom shield layer 3 made of a magnetic material and formed on the insulating layer 2; a bottom shield gap film 4 made of an insulating material such as alumina and formed on the bottom shield layer 3; and an MR element 5 for reading formed on the bottom shield gap film 4 and having an end located in the air bearing surface 30. The read head further comprises: a pair of lead layers 6 formed on the bottom shield gap film 4 and electrically connected to the MR element 5; a top shield gap film 7 covering the bottom shield gap film 4, the MR element 5 and the lead layers 6; and a top shield layer 8 made of a magnetic material and formed on the top shield gap film 7. The magnetism intercepting layer 9 is formed on the top shield layer 8. The MR element 5 may be an element made of a magnetosensitive film that exhibits a magnetoresistive effect, such as an anisotropic magnetoresistive (AMR) element, a giant magnetoresistive (GMR) element, or a tunnel magnetoresistive (TMR) element.

The write head comprises: a bottom pole layer 10 made of a magnetic material and formed on the magnetism intercepting layer 9; a write gap layer 11 made of an insulating material such as alumina and formed on the bottom pole layer 10; an insulating layer 12 made of a thermoset photoresist, for example, and formed in a portion on the gap layer 11 in which a thin-film coil is to be formed; a first layer 13 of the thin-film coil made of a conductive material such as Cu and formed on the insulating layer 12; an insulating layer 14 made of a thermoset photoresist, for example, and covering the insulating layer 12 and the first layer 13 of the coil; a second layer 15 of the coil made of a conductive material such as Cu and formed on the insulating layer 14; an insulating layer 16 made of a thermoset photoresist, for example, and covering the second layer 15 of the coil; and a top pole layer 17 made of a magnetic material and formed on the insulating layer 16. The overcoat layer 18 is made of an insulating material such as alumina and covers the top pole layer 17.

Each of the bottom pole layer 10 and the top pole layer 17 has a magnetic pole portion that is a portion located on a side of the air bearing surface 30. These pole portions are opposed to each other, the gap layer 11 being located between the pole portions. The pole portion of the top pole layer 17 has a width equal to the write track width. The top pole layer 17 has an end located farther from the air bearing surface 30. This end of the top pole layer 17 is connected and magnetically coupled to the bottom pole layer 10 through a contact hole formed in the gap layer 11.

The first layer 13 and the second layer 15 of the thin-film coil are connected to each other and wound around the contact hole formed in the gap layer 11.

As thus described, the thin-film magnetic head of this embodiment comprises the medium facing surface that faces toward a recording medium (the air bearing surface 30), the read head, and the write head. The read head includes the MR element 5, and the bottom shield layer 3 and the top shield layer 8 for shielding the MR element 5. The bottom shield layer 3 and the top shield layer 8 have portions located on a side of the air bearing surface that are opposed to each other, the MR element 5 being located between these portions.

The write head includes the bottom pole layer 10 and the top pole layer 17, magnetically coupled to each other, each of which includes at least one layer. The bottom pole layer 10 and the top pole layer 17 include the pole portions opposed to each other and placed in regions on a side of the air bearing surface 30. The write head further includes: the write gap layer 11 placed between the pole portion of the bottom pole layer 10 and the pole portion of the top pole layer 17; and the layers 13 and 15 of the thin-film coil at least part of which is placed between the bottom pole layer 10 and the top pole layer 17, the at least part of the coil being insulated from the bottom pole layer 10 and the top pole layer 17.

The read head and the write head are placed such that the top shield layer 8 of the read head and the bottom pole layer 10 of the write head are opposed to each other. The magnetism intercepting layer 9 is placed between the top shield layer 8 and the bottom pole layer 10.

In this embodiment the top shield layer 8 corresponds to one of the first and second shield layers of the invention. The bottom shield layer 3 corresponds to the other one of the first and second shield layers. The bottom pole layer 10 corresponds to one of the first and second magnetic layers of the invention. The top pole layer 17 corresponds to the other one of the first and second magnetic layers.

A method of manufacturing the thin-film magnetic head of this embodiment will now be described. In this method the insulating layer 2 is formed through sputtering, for example, on the substrate 1. The bottom shield layer 3 is then formed through sputtering or plating, for example, on the insulating layer 2. Next, the bottom shield gap film 4 is formed through sputtering, for example, on the bottom shield layer 3. The MR element 5 is formed through sputtering, for example, on the bottom shield gap film 4. A pair of lead layers 6 to be electrically connected to the MR element 5 are formed through sputtering, for example, on the bottom shield gap film 4. The top shield gap film 7 is then formed through sputtering, for example, on the bottom shield gap film 4 and the MR element 5. The top shield layer 8 is formed through plating, for example, on the top shield gap film 7. The magnetism intercepting layer 9 is formed through plating, for example, on the top shield layer 8.

Next, the bottom pole layer 10 is formed through plating, for example, on the magnetism intercepting layer 9. The write gap layer 11 is formed through sputtering, for example, on the bottom pole layer 10. Next, a portion of the gap layer 11 located in the center portion of the thin-film coil is etched to form a contact hole for making a magnetic path. The insulating layer 12 is formed in the portion where the thin-film coil is to be formed on the gap layer 11. The first layer 13 of the coil is formed through plating, for example, on the insulating layer 12. The insulating layer 14 is then formed to cover the insulating layer 12 and the first layer 13 of the coil. The second layer 15 of the coil is formed through plating, for example, on the insulating layer 14. The insulating layer 16 is then formed to cover the insulating layer 14 and the second layer 15 of the coil. Next, the top pole layer 17 that extends from the air bearing surface (the medium facing surface) 30 through the top of the insulating layers 14 and 16 to the contact hole of the gap layer 11 is formed. Using the pole portion of the top pole layer 17 as a mask, the gap layer 11 is selectively etched through dry etching, and a portion of the bottom pole layer 10 is further etched selectively. A trim structure as shown in FIG. 1 is thus formed. The trim structure suppresses an increase in the effective track width due to expansion of a magnetic flux generated during writing in a narrow track.

Next, the overcoat layer 18 is formed through sputtering, for example, over the entire surface. The surface of the overcoat layer 18 is then flattened and pads (not shown) for electrodes are formed on the overcoat layer 18. Finally, lapping of the slider including the foregoing layers is performed to form the air bearing surfaces 30 of the thin-film magnetic head including the write head and the read head. The thin-film magnetic head of the embodiment is thus completed.

Figure 3:
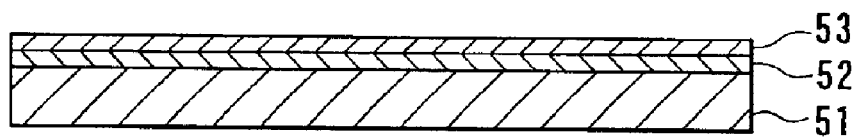
FIG. 3 is a cross section for illustrating a step in a method of fabricating the top shield layer, the magnetism intercepting layer and the bottom pole layer of the thin-film magnetic head of the embodiment.

Reference is now made to FIG. 3 to FIG. 7 to describe a method of forming the top shield layer 8, the magnetism intercepting layer 9 and the bottom pole layer 10 in detail. In this method, as shown in FIG. 3, a bonding layer 52 made of titanium (Ti), for example, is formed, as required, on a layer 51 (the top shield gap film 7 of FIG. 1 and FIG. 2) to be the base of the top shield layer 8. The bonding layer 52 is provided for increasing the adhesiveness of the layer 51 to an electrode film described later. Next, on the bonding layer 52, the electrode film 53 is formed for making the top shield layer 8 through plating.

Figure 4:
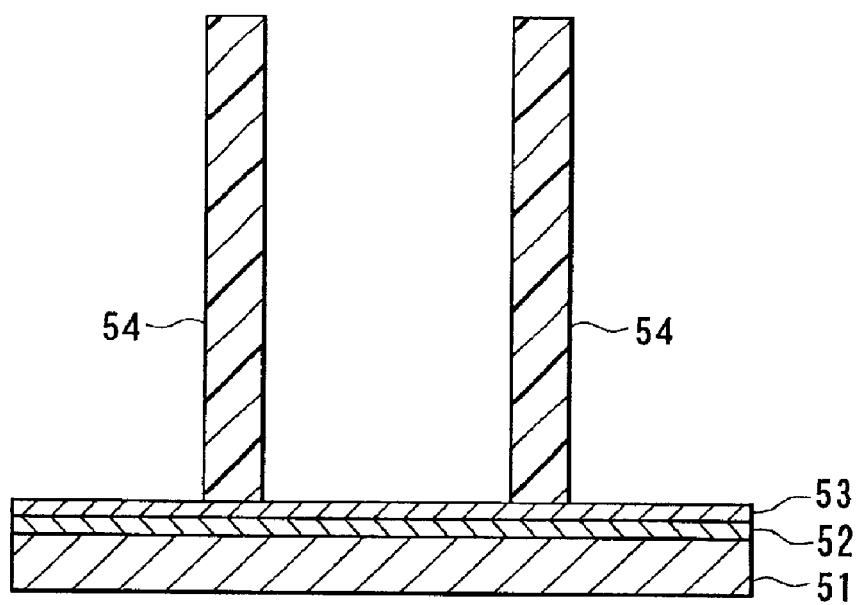
FIG. 4 is a cross section for illustrating a step that follows FIG. 3.

Next, as shown in FIG. 4, a resist is patterned into a specific shape to form a frame 54 used for making the top shield layer 8.

Figure 5:
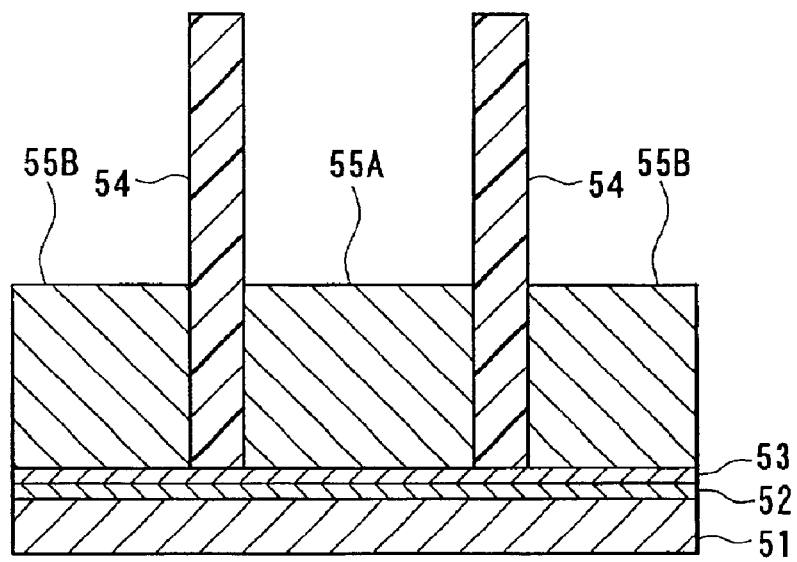
FIG. 5 is a cross section for illustrating a step that follows FIG. 4.

Next, as shown in FIG. 5, plating is performed, using the frame 54, to form plating layers 55A and 55B on the electrode film 53. Numeral 55A indicates the plating layer to be the top shield layer 8. Numeral 55B indicates the other plating layers.

Figure 6:
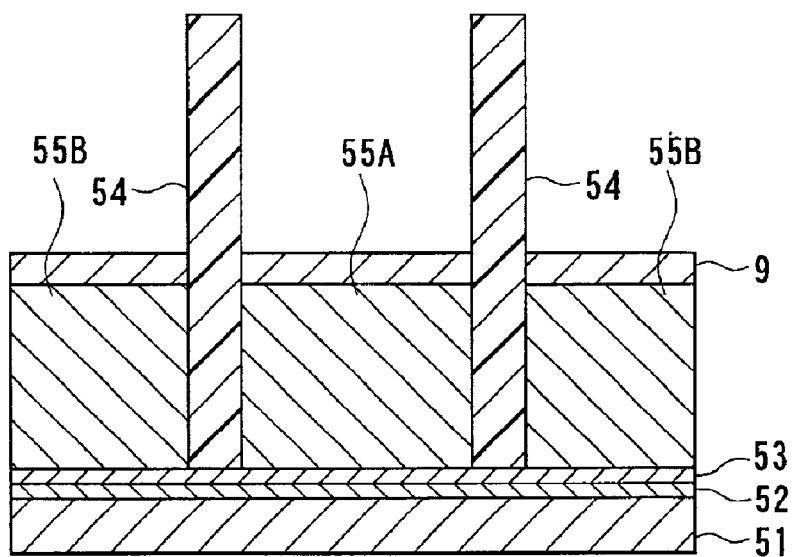
FIG. 6 is a cross section for illustrating a step that follows FIG. 5.

Next, as shown in FIG. 6, plating is performed, using the frame 54, to form the magnetism intercepting layer 9 on the plating layers 55A and 55B. In this embodiment the magnetism intercepting layer 9 is made of a nonmagnetic metal material that is capable of being formed through plating. Such nonmagnetic metal materials are platinum, an Ni—Cu alloy and so on. In particular, it is preferred to utilize platinum.

Figure 7:
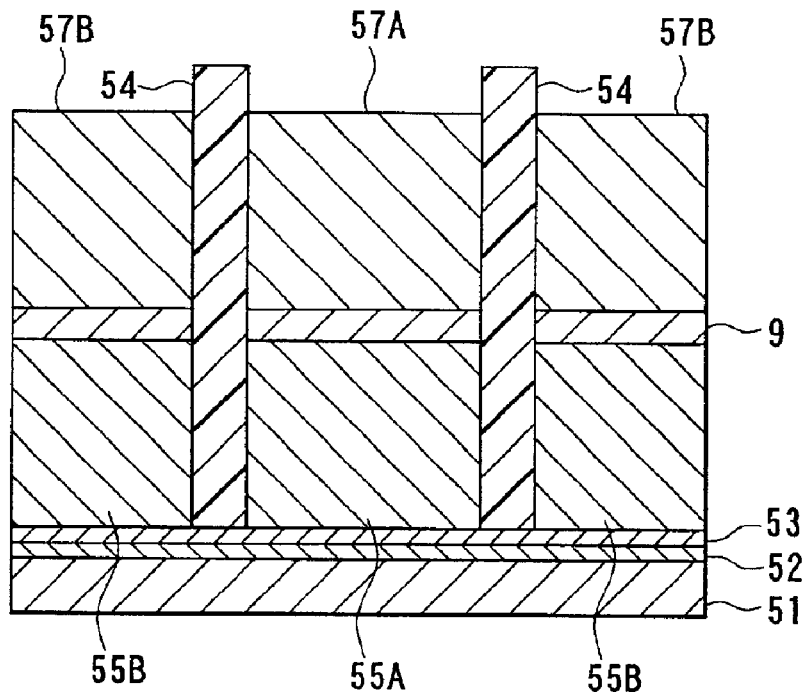
FIG. 7 is a cross section for illustrating a step that follows FIG. 6.

Next, as shown in FIG. 7, plating is performed, using the frame 54, to form plating layers 57A and 57B on the intercepting layer 9. Numeral 57A indicates the plating layer to be the bottom pole layer 10. Numeral 57B indicates the other plating layers.

According to the embodiment as thus described, the top shield layer 8, the magnetism intercepting layer 9 and the bottom pole layer 10 are consecutively formed through plating, using the single frame 54.

According to the embodiment as thus described, the magnetism intercepting layer 9 is provided between the top shield layer 8 and the bottom pole layer 10. It is thereby possible to reduce write induced noise produced in a read signal immediately after writing is performed.

Figure 8:
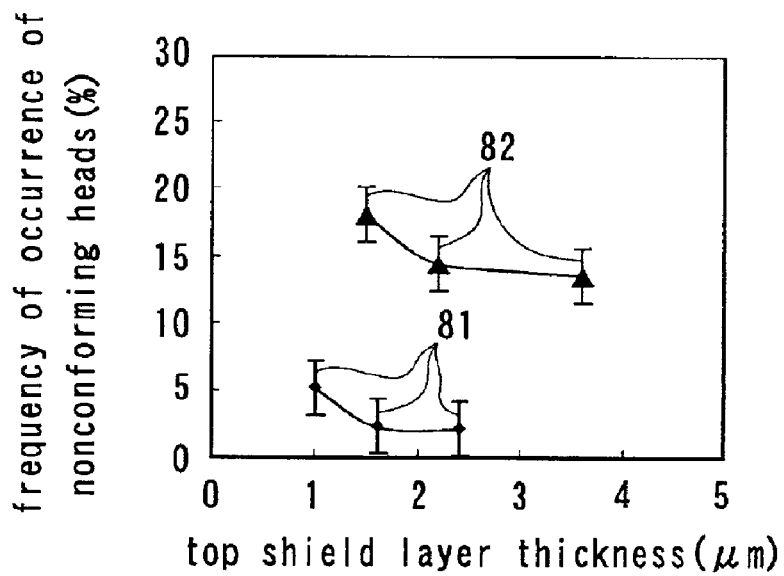
FIG. 8 is a plot showing the result of experiment in which the frequency of occurrence of nonconforming heads were compared between the thin-film magnetic heads of the embodiment of the invention and the related-art thin-film magnetic heads.

Reference is now made to FIG. 8 to describe this effect. FIG. 8 shows the result of experiment in which the frequency of occurrence of nonconforming heads resulting from write induced noise was compared between the thin-film magnetic heads of the embodiment of the invention and the related-art thin-film magnetic heads in which the top shield layer and the bottom pole layer were merged. In this experiment three types of heads of the embodiment were utilized wherein the bottom pole layer 10 was 1.4 $\mu$m thick, and the magnetism intercepting layer 9 made of platinum was 0.2 $\mu$m thick. The three types had the top shield layers 8 having different thicknesses. Three types of related-art heads, whose top shield layers also functioning as the bottom pole layers had different thicknesses, were utilized. In the experiment the nonconforming head was defined as a head of which the number of occurrences of write induced noise exceeding 50 $\mu$V was 50 or greater when writing was performed 105 times. This experiment was performed for the respective types of heads several times to obtain the relationship between the thickness of the top shield layer and the frequency of occurrence of nonconforming heads, as shown in FIG. 8. In FIG. 8 numeral 81 indicates the range of occurrence of nonconforming heads of the three types of heads of the embodiment of the invention. Rhombuses indicate mean values of the frequencies of occurrence of nonconforming heads of the three types of heads of the embodiment. Numeral 82 indicates the range of occurrence of nonconforming heads of the three types of related-art heads. Deltas indicate mean values of the frequencies of occurrence of nonconforming heads of the three types of related-art heads.

As shown in FIG. 8, it is noted that the frequency of occurrence of nonconforming heads of the embodiment resulting from write induced noise was much smaller than the frequency of occurrence of nonconforming heads of the related-art heads in which the top shield layer and the bottom pole layer were merged. It is thus noted that the embodiment of the invention greatly reduces write induced noise, compared to the related-art heads.

According to the thin-film magnetic heads of the embodiment, as shown in FIG. 8, it is noted that write induced noise is greatly reduced while the total thickness of the top shield layer 8, the magnetism intercepting layer 9 and the bottom pole layer 10 was maintained at a thickness nearly equal to the thickness of the top shield layer of the related-art heads that also functions as the bottom pole layer. Therefore, according to the embodiment, it is not necessary to make the space between the write gap layer 11 and the MR element 5 greater than required.

Figure 9:
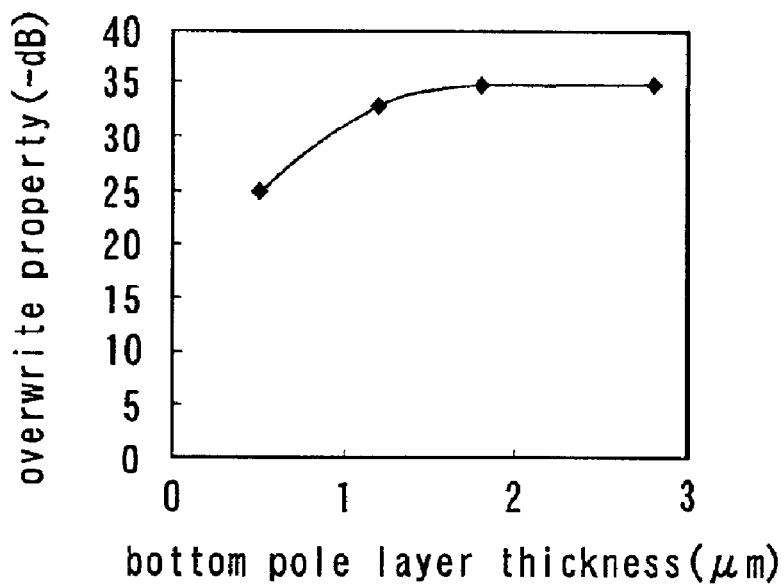
FIG. 9 is a plot showing the result of experiment performed to obtain the relationship between the thickness of the bottom pole layer of the thin-film magnetic head of the embodiment of the invention and the overwrite property thereof.

FIG. 9 shows the result of experiment performed to obtain the relationship between the thickness of the bottom pole layer 10 of the thin-film magnetic head of the embodiment of the invention and the overwrite property thereof that is a parameter indicating one of characteristics when data is written over existing data. In this experiment the thickness of the top shield layer 8 was 1.6 $\mu$m and the thickness of the magnetism intercepting layer 9 made of platinum was 0.2 $\mu$m. As shown in FIG. 9, it is noted that a decrease in the overwrite property of the thin-film magnetic head of the embodiment was very small even if the thickness of the bottom pole layer 10 was reduced to about 1 $\mu$m.

According to the embodiment, the top shield layer 8, the magnetism intercepting layer 9 and the bottom pole layer 10 are consecutively formed through plating. In addition, since the magnetism intercepting layer 9 has conductivity, it is not necessary to etch the portion of the magnetism intercepting layer in which the electrode layer is to be formed so as to make conduction between the lead layers connected to the MR element and the electrode layer formed on the magnetism intercepting layer 9, as in the prior-art method. The step of this etching is therefore not required. According to the embodiment of the invention, as thus described, the number of manufacturing steps is much smaller than the number of steps required for manufacturing the related-art thin-film magnetic head, as shown in the comparison between the steps of FIG. 3 to FIG. 7 and the steps of FIG. 13 to FIG. 25. The embodiment of the invention thus suppresses increases in costs and time required for manufacturing thin-film magnetic heads each of which incorporates the magnetism intercepting layer 9.

Figure 10:
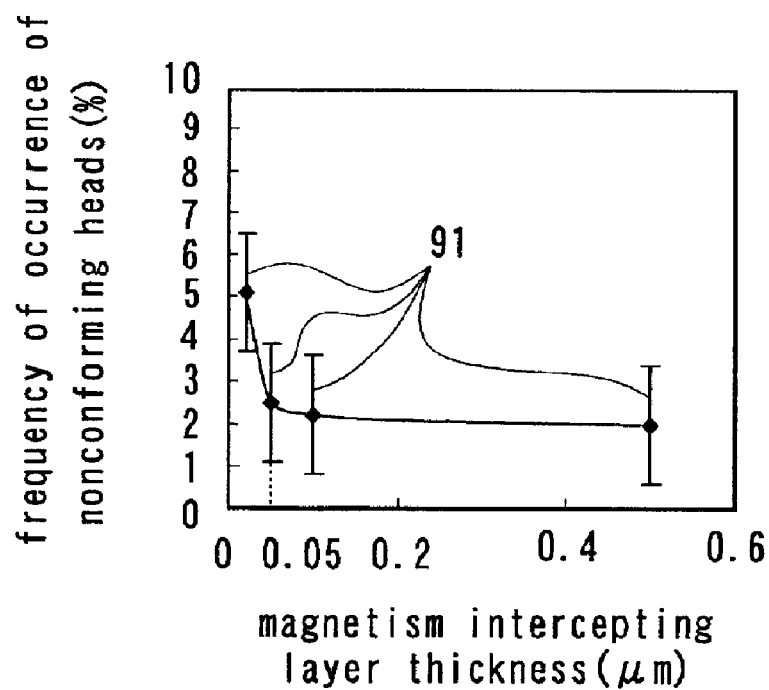
FIG. 10 is a plot showing the result of experiment performed to obtain the relationship between the thickness of the magnetism intercepting layer of the thin-film magnetic heads of the embodiment of the invention and the frequency of occurrence of nonconforming heads.
Figure 11:
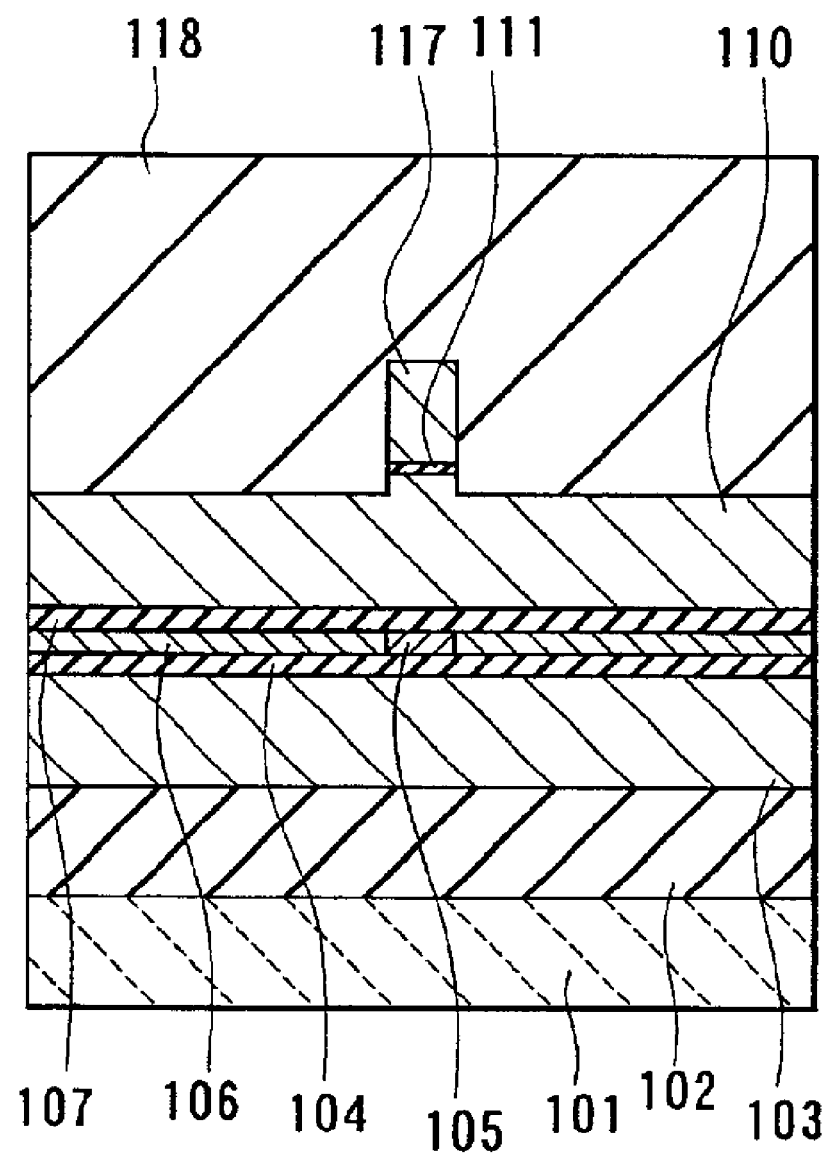
FIG. 11 is a cross section for illustrating an example of configuration of the related-art thin-film magnetic head.
Figure 12:
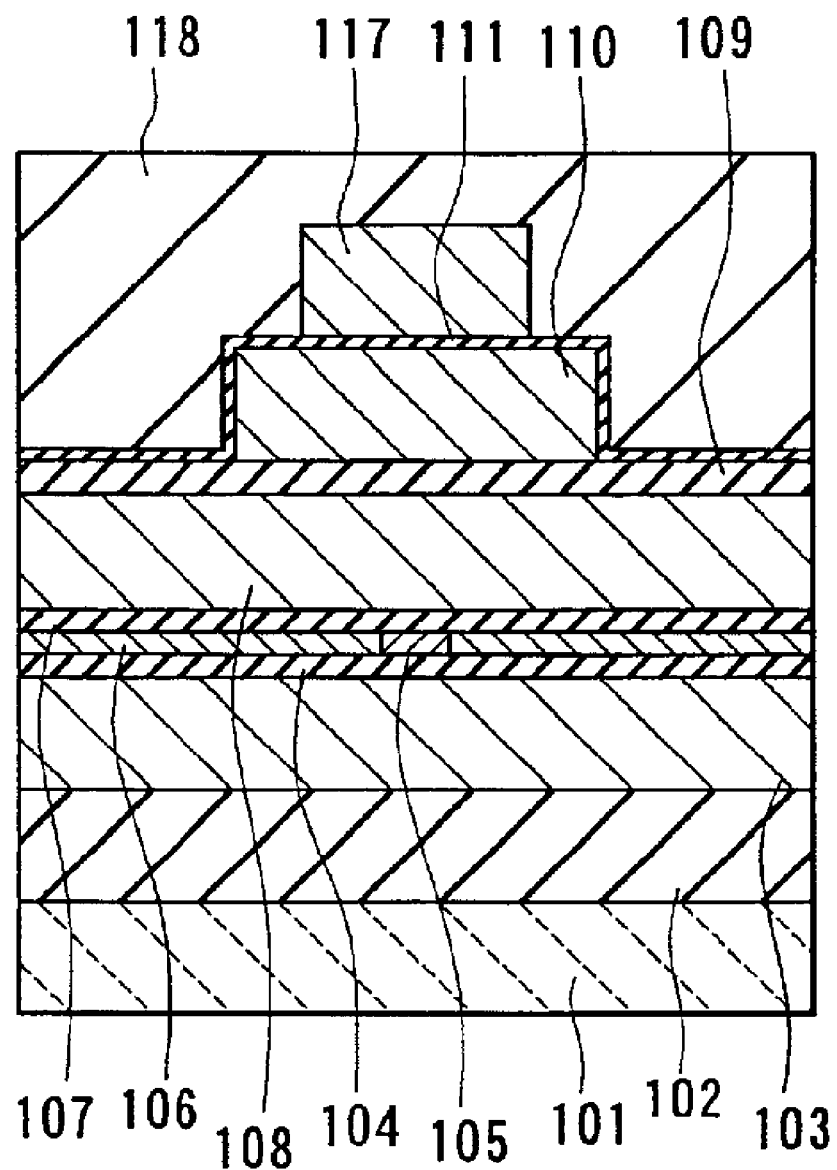
FIG. 12 is a cross section for illustrating another example of configuration of the related-art thin-film magnetic head.
Figure 13:
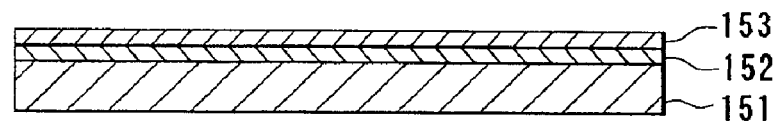
FIG. 13 is a cross section for illustrating a step in a method of fabricating the top shield layer, the magnetism intercepting layer and the bottom pole layer of the thin-film magnetic head of FIG. 12.
Figure 14:
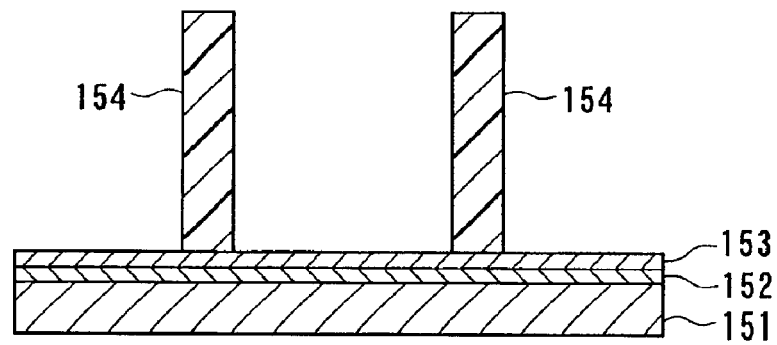
FIG. 14 is a cross section for illustrating a step that follows FIG. 13.
Figure 15:
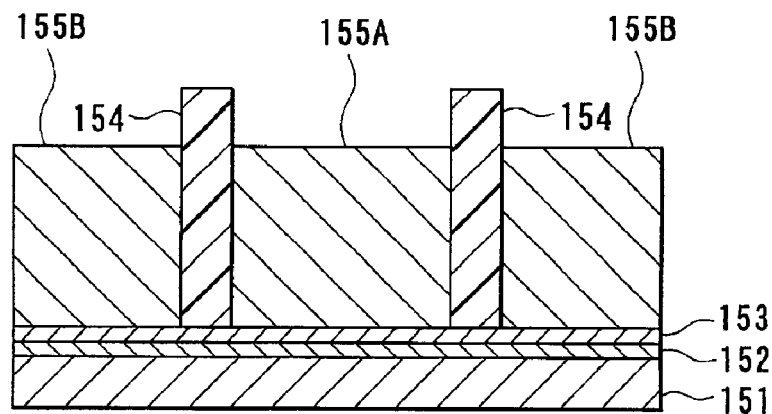
FIG. 15 is a cross section for illustrating a step that follows FIG. 14.
Figure 16:
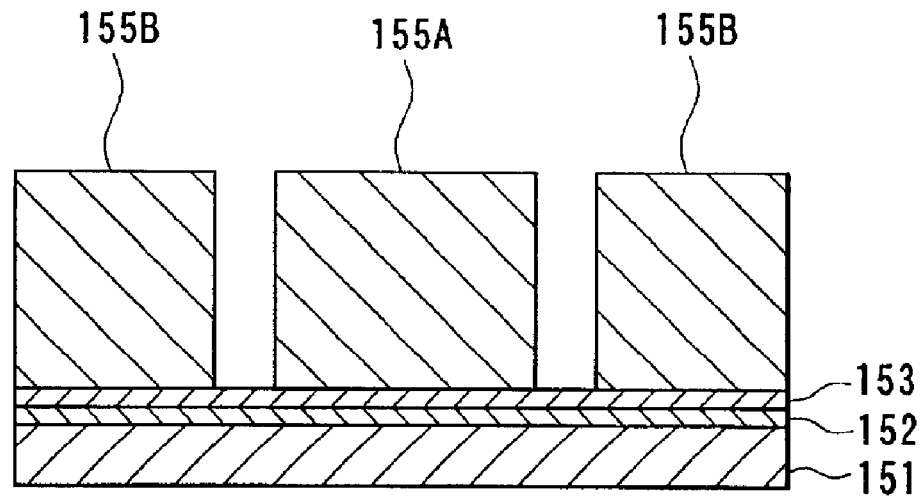
FIG. 16 is a cross section for illustrating a step that follows FIG. 15.
Figure 17:
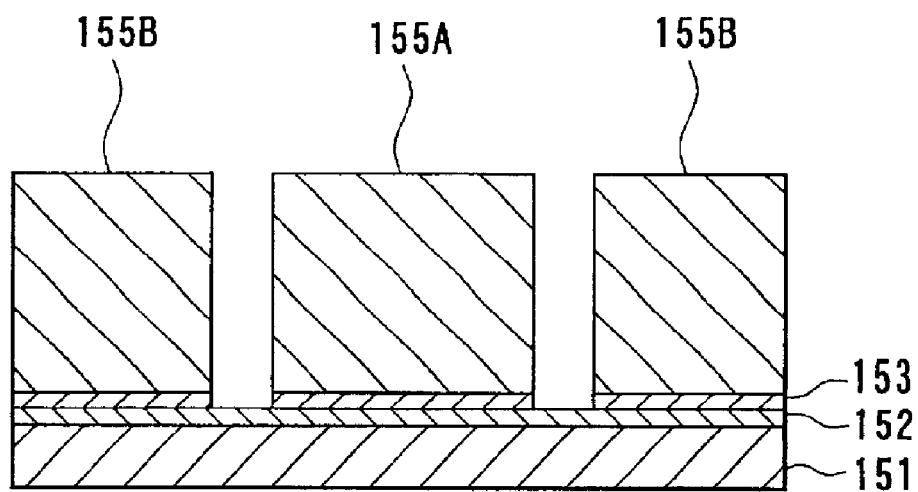
FIG. 17 is a cross section for illustrating a step that follows FIG. 16.
Figure 18:
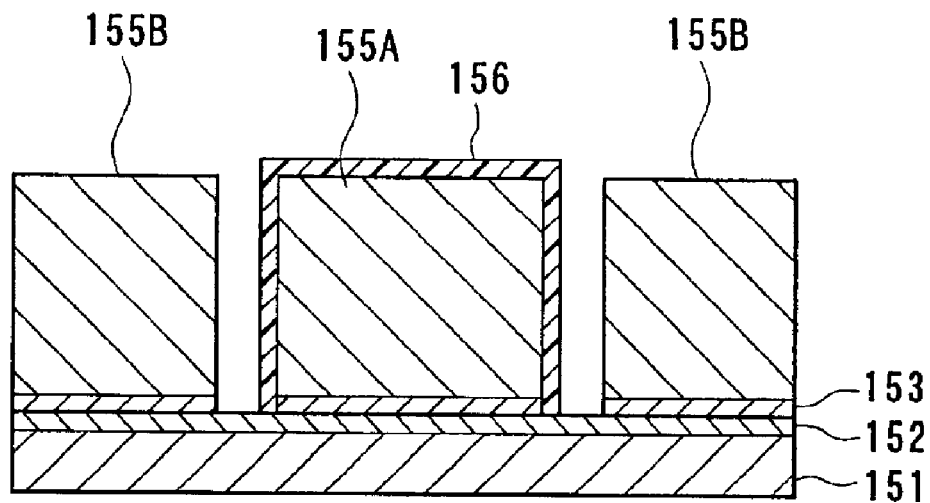
FIG. 18 is a cross section for illustrating a step that follows FIG. 17.
Figure 19:
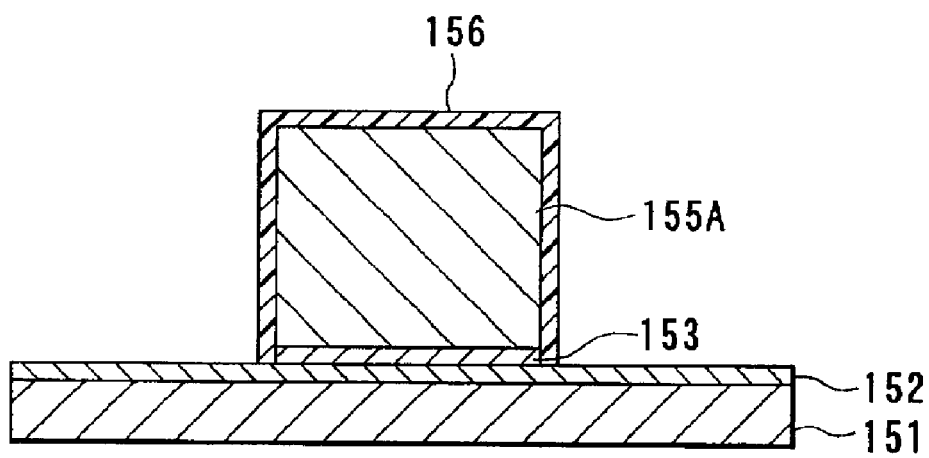
FIG. 19 is a cross section for illustrating a step that follows FIG. 18.
Figure 20:
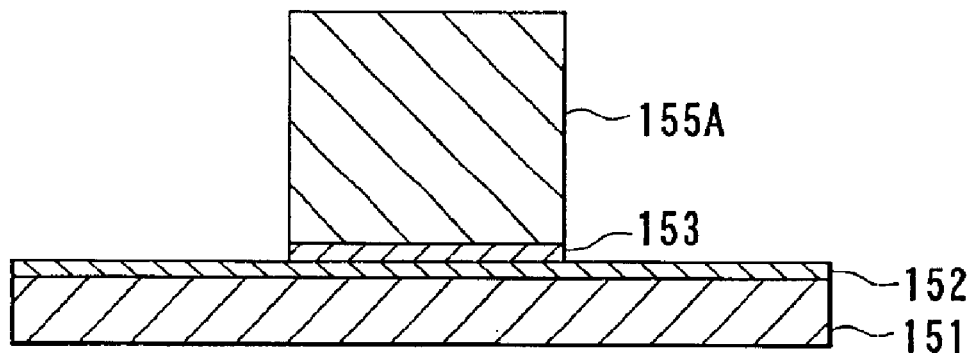
FIG. 20 is a cross section for illustrating a step that follows FIG. 19.
Figure 21:
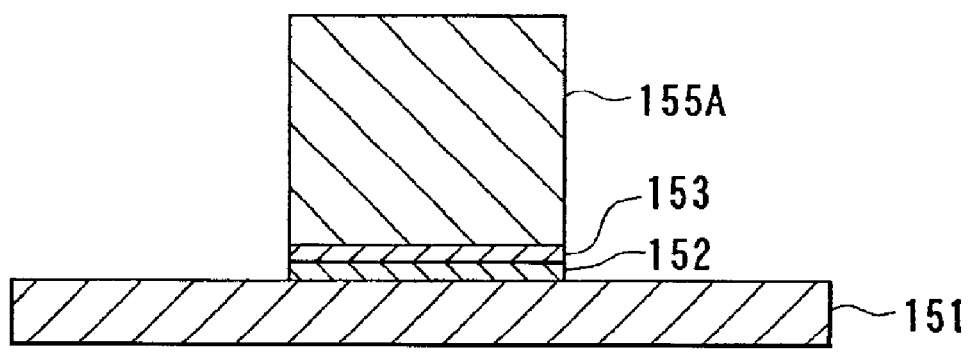
FIG. 21 is a cross section for illustrating a step that follows FIG. 20.
Figure 22:
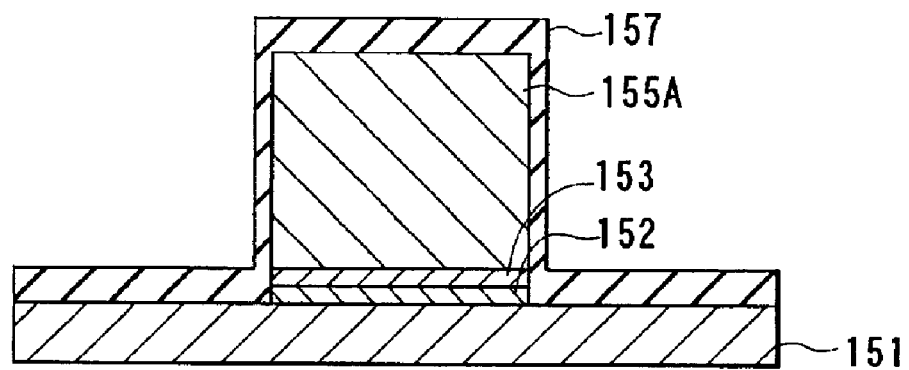
FIG. 22 is a cross section for illustrating a step that follows FIG. 21.
Figure 23:
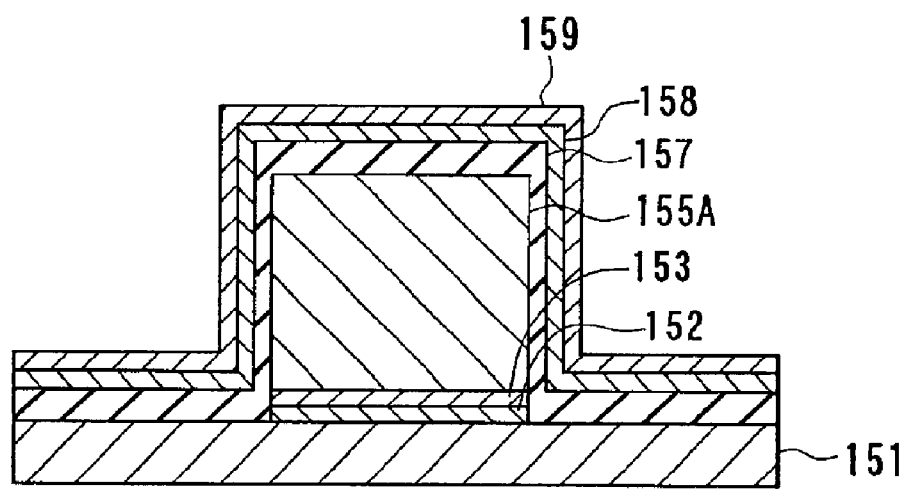
FIG. 23 is a cross section for illustrating a step that follows FIG. 22.
Figure 24:
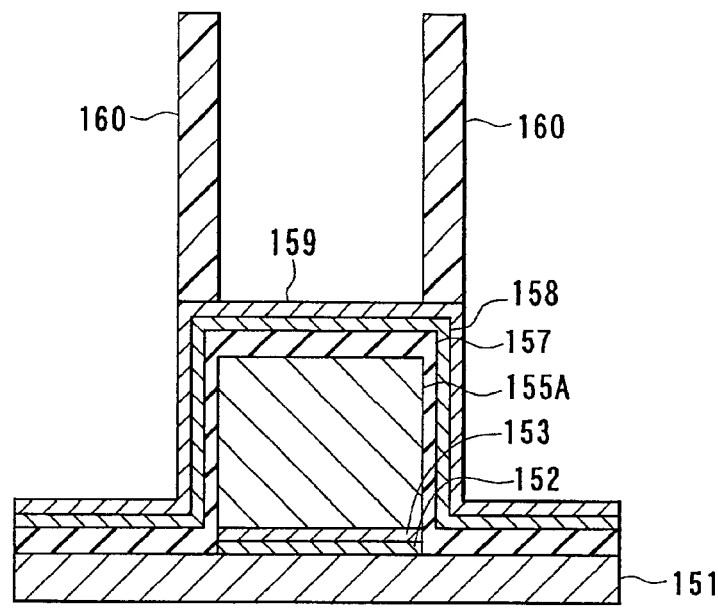
FIG. 24 is a cross section for illustrating a step that follows FIG. 23.
Figure 25:
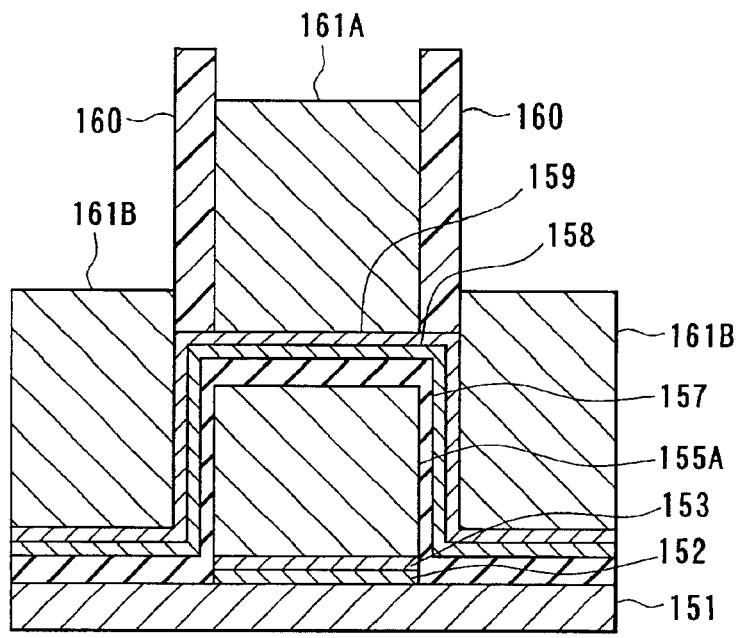
FIG. 25 is a cross section for illustrating a step that follows FIG. 24.

FIG. 10 shows the result of experiment performed to obtain the relationship between the thickness of the magnetism intercepting layer 9 made of platinum of the thin-film magnetic heads of the embodiment of the invention and the frequency of occurrence of nonconforming heads resulting from write induced noise. In this experiment four types of heads were utilized wherein the top shield layer 8 was 1.6 $\mu$m thick, and the bottom pole layer 10 was 1.4 $\mu$m thick. The four types had the magnetism intercepting layers 9 having different thicknesses. In FIG. 10 numeral 91 indicates the range of occurrence of nonconforming heads of the four types of heads. Rhombuses indicate mean values of the frequencies of occurrence of nonconforming heads of the four types of heads. According to the thin-film magnetic heads of the embodiment, as shown in FIG. 10, it is noted that the effect of reducing write induced noise is fully achieved as long as the thickness of the magnetism intercepting layer 9 is 0.05 $\mu$m or greater.

Therefore, it is acceptable that the total thickness of the top shield layer 8, the magnetism intercepting layer 9 and the bottom pole layer 10 is 3.05 $\mu$m or greater, that is, about 3 $\mu$m or greater, if the top shield layer 8 is 1.6 $\mu$m thick and the bottom pole layer 10 is 1.4 $\mu$m thick. It is thus possible to make the space between the write gap layer 11 and the MR element 5 sufficiently small.

The reason that the magnetism intercepting layer 9 of the embodiment is preferably made of platinum will now be described.

If the magnetism intercepting layer 9 is made of platinum, diffusion of nickel (Ni) from the top shield layer 8 or the bottom pole layer 10 to the magnetism intercepting layer 9 is prevented even if the thickness of the intercepting layer 9 is reduced to 0.05 $\mu$m. The effect of reducing write induced noise is thereby fully achieved, as shown in FIG. 10. It is thus possible to reduce the thickness of the intercepting layer 9 while the effect of reducing noise is maintained.

The Vickers hardness of a platinum plating film is 500 to 700 which is greater than the hardness of other precious metals. Therefore, if the magnetism intercepting layer 9 is made of platinum, it is impossible that smears of the intercepting layer 9 occur when the slider is lapped to form the air bearing surface 30. To prevent smears of the intercepting layer 9, it is preferred that the intercepting layer 9 is made of a material whose Vickers hardness is 400 or greater.

Since platinum exhibits good corrosion resistance, the intercepting layer 9 made of platinum will not corrode when the slider is lapped.

In the embodiment the intercepting layer 9 is preferably made of a single nonmagnetic metal element, such as platinum, which is not used for the top shield layer 8 or the bottom pole layer 10. The reason will now be described.

If the intercepting layer 9 is made of a single nonmagnetic metal element which is not used for the top shield layer 8 or the bottom pole layer 10, it is possible to easily determine the thickness of the intercepting layer 9 through X-ray fluorescence analysis, for example. Therefore, it is not necessary to consider variations in property depending on the composition that would be problematic if the intercepting layer 9 is made of an alloy. It is therefore easy to perform manufacturing process control.

An example of problem that would arise when the intercepting layer 9 is made of an alloy will now be described, wherein the intercepting layer 9 is made of an Ni alloy. For example, when the intercepting layer 9 is made of an Ni—Cu alloy, the Ni—Cu alloy is a magnetic substance if the amount of nickel contained is 65 weight % or greater. The function of the intercepting layer 9 is thereby reduced. If the amount of nickel contained is 50 weight % or smaller, corrosion of the intercepting layer 9 is likely to occur. As thus described, variations in property depending on the composition increase when the intercepting layer 9 is made of an Ni—Cu alloy. It is therefore required to control the amount of nickel contained within the range between 50 and 65 weight %. In addition, if the intercepting layer 9 is made of multilayers of Ni alloy, it is impossible to analyze the nickel composition of each of the layers separately. Because of those problems, it is very difficult to perform process control if the intercepting layer 9 is made of an Ni alloy.

The present invention is not limited to the foregoing embodiment but may be practiced in still other ways. In the foregoing embodiment, for example, the thin-film magnetic head is disclosed, comprising the read head formed on the base body and the write head stacked on the read head. Alternatively, the invention may be applied to a thin-film magnetic head comprising the write head formed on the base body and the read head stacked on the write head. In this case the magnetism intercepting layer may be provided between the top pole layer of the write head and the bottom shield layer of the read head. To fabricate this thin-film magnetic head, the write head is first formed, the magnetism intercepting layer is then formed, and the read head is formed. In this case the top pole layer of the write head, the magnetism intercepting layer and the bottom shield layer of the read head may be consecutively formed through plating.

Although the top shield layer 8 (one of the shield layers), the magnetism intercepting layer 9 and the bottom pole layer 10 (one of the magnetic layers) are consecutively formed through plating in the foregoing embodiment, it is possible to form the magnetism intercepting layer and either one of the shield layers or one of the magnetic layers through plating consecutively.

Although the top shield layer 8, the magnetism intercepting layer 9 and the bottom pole layer 10 are consecutively formed through frame plating in the foregoing embodiment, it is possible to form these layers 8, 9 and 10 through pattern plating (partial plating) consecutively.

According to the thin-film magnetic head of the invention described so far, the magnetism intercepting layer provided between one of the shield layers of the read head and one of the magnetic layers of the write head is made of a nonmagnetic metal material that is capable of being formed through plating. It is thereby possible to form through plating the magnetism intercepting layer and at least one of one of the shield layers and one of the magnetic layers consecutively. As a result, it is possible to reduce noise produced in a read signal immediately after writing is performed by the thin-film magnetic head. It is also possible to suppress increases in costs and time required for manufacturing the thin-film magnetic head.

According to the method of manufacturing the thin-film magnetic head of the invention, the magnetism intercepting layer provided between one of the shield layers of the read head and one of the magnetic layers of the write head is formed through plating. It is thereby possible to form through plating the magnetism intercepting layer and at least one of one of the shield layers and one of the magnetic layers consecutively. As a result, it is possible to reduce noise produced in a read signal immediately after writing is performed by the thin-film magnetic head. It is also possible to suppress increases in costs and time required for manufacturing the thin-film magnetic head.

According to the thin-film magnetic head or the method of manufacturing the same of the invention, the magnetism intercepting layer may be made of a nonmagnetic metal material of which Vickers hardness is 400 or greater. It is thereby possible to prevent smears of the magnetism intercepting layer.

According to the thin-film magnetic head or the method of manufacturing the same of the invention, the nonmagnetic metal material may be made of a single element which is not used for one of the shield layers and one of the magnetic layers. In this case it is not necessary to consider variations in property depending on the composition of the material, and it is thus easy to perform process control.

According to the thin-film magnetic head or the method of manufacturing the same of the invention, the magnetism intercepting layer may be made of platinum that is a nonmagnetic metal material. It is thereby possible to prevent corrosion and smears of the magnetism intercepting layer. Furthermore, it is possible to prevent diffusion of nickel from one of the shield layers or one of the magnetic layers to the magnetism intercepting layer, and to reduce the thickness of the magnetism intercepting layer while the effect of reducing noise is maintained.

According to the thin-film magnetic head or the method of manufacturing the same of the invention, the magnetism intercepting layer may have a thickness of 0.05 $\mu$m or greater. It is thereby possible to fully exhibit the effect of reducing noise.

According to the method of manufacturing the thin-film magnetic head of the invention, one of the shield layers, the magnetism intercepting layer and one of the magnetic layers may be consecutively formed through plating. It is thereby possible to further suppress increases in costs and time required for manufacturing the thin-film magnetic head.

Obviously many modifications and variations of the present invention are possible in the light of the above teachings. It is therefore to be understood that within the scope of the appended claims the invention may be practiced otherwise than as specifically described.

What is claimed is:

1. A thin-film magnetic head comprising:
   a medium facing surface that faces toward a recording medium;
   a read head including: a magnetoresistive element; and a first shield layer and a second shield layer for shielding the magnetoresistive element, the first and second shield layers having portions that are located in regions on a side of the medium facing surface and opposed to each other, the magnetoresistive element being placed between the portions of the shield layers; and
   a write head including: a first magnetic layer and a second magnetic layer that are magnetically coupled to each other and include magnetic pole portions opposed to each other and placed in regions on a side of the medium facing surface, each of the magnetic layers including at least one layer; a gap layer provided between the pole portions of the first and second magnetic layers; and a thin-film coil at least part of which is placed between the first and second magnetic layers, the at least part of the coil being insulated from the first and second magnetic layers; wherein
   the read head and the write head are placed such that one of the shield layers of the read head and one of the magnetic layers of the write head are opposed to each other, the thin-film magnetic head further comprising:
   a magnetism intercepting layer for intercepting magnetism provided between the one of the shield layers and the one of the magnetic layers, and extending to a back gap region, the magnetism intercepting layer having a thickness of 0.2 $\mu$m or greater and made of a nonmagnetic metal material that is capable of being formed through plating, wherein
   the one of the shield layers of the read head, the one of the magnetic layers of the write head, and the magnetism intercepting layer have substantially the same plane geometries by being formed using a single frame.

2. The thin-film magnetic head according to claim 1 wherein the nonmagnetic metal material has a Vickers hardness of 400 or greater.

3. The thin-film magnetic head according to claim 1 wherein the nonmagnetic metal material is made of a single element that is not used for the one of the shield layers and the one of the magnetic layers.

4. The thin-film magnetic head according to claim 1 wherein the nonmagnetic metal material is platinum.

* * * * *